Nov. 26, 1963  R. R. KOOIMAN ET AL  3,111,847
DIGITAL ROTATING PRESSURE REFERENCE
Filed June 17, 1960  3 Sheets-Sheet 1
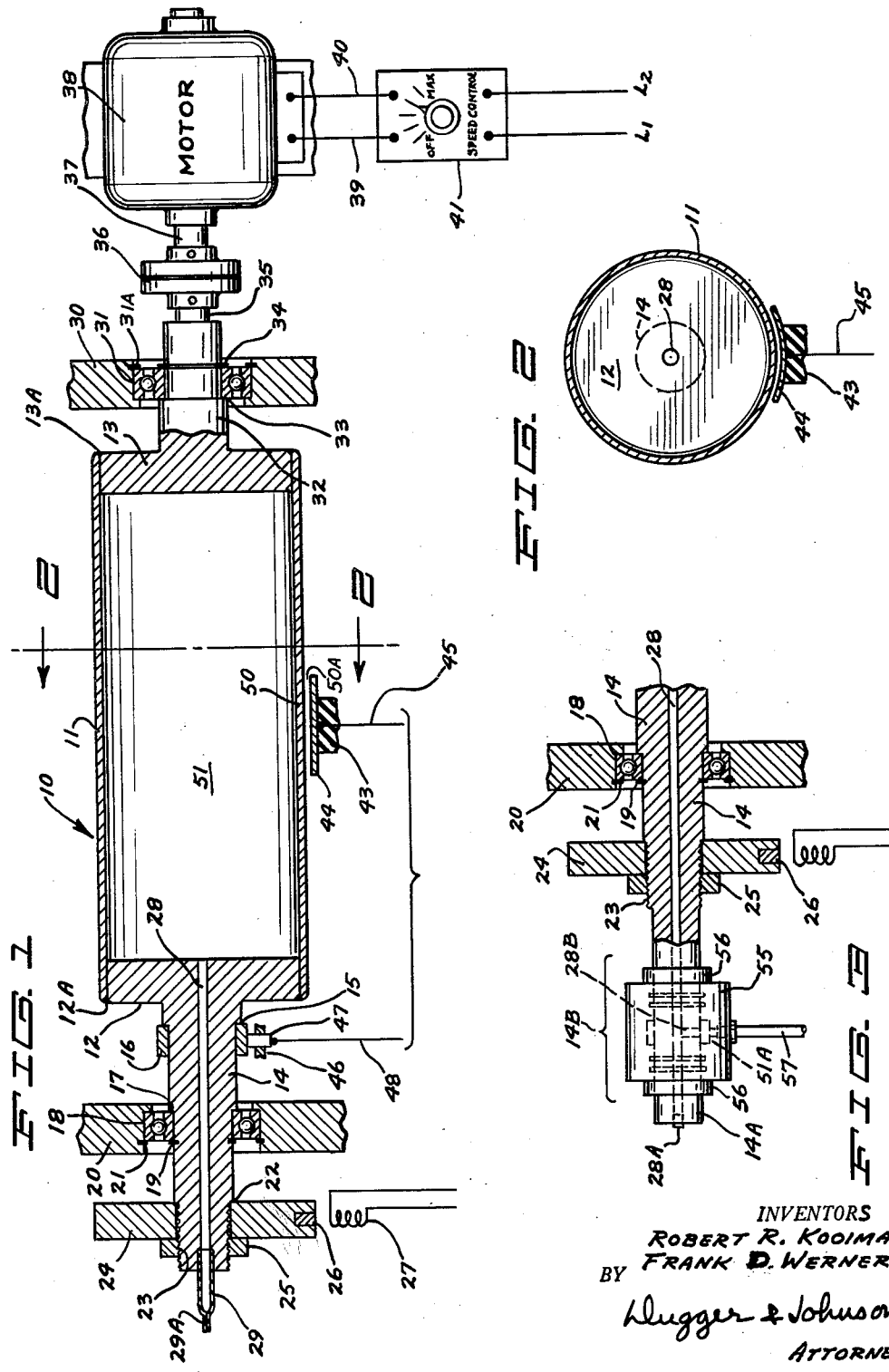
INVENTORS
ROBERT R. KOOIMAN
FRANK D. WERNER
BY
Dugger & Johnson
ATTORNEYS

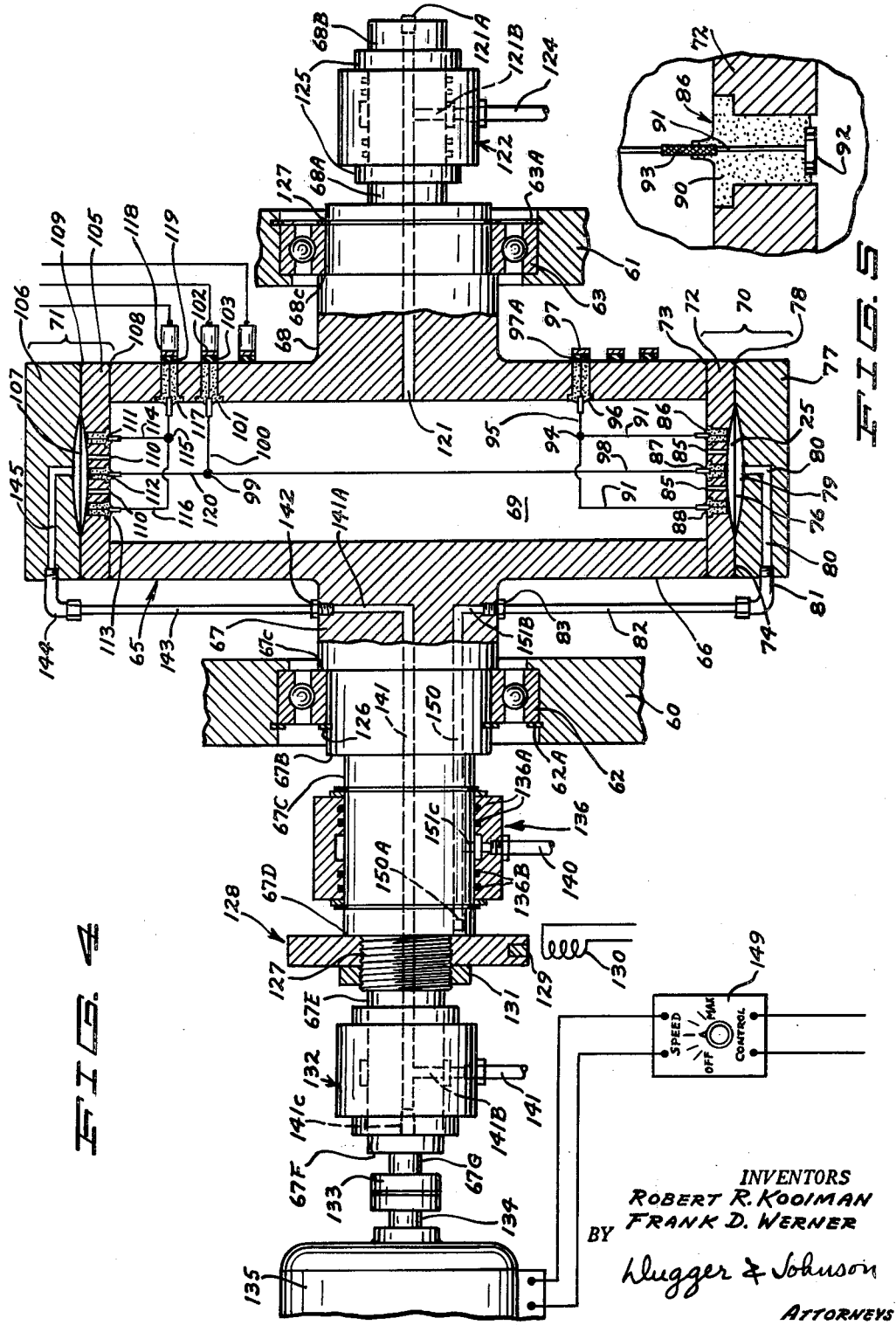

Nov. 26, 1963 R. R. KOOIMAN ET AL 3,111,847
DIGITAL ROTATING PRESSURE REFERENCE
Filed June 17, 1960 3 Sheets-Sheet 3
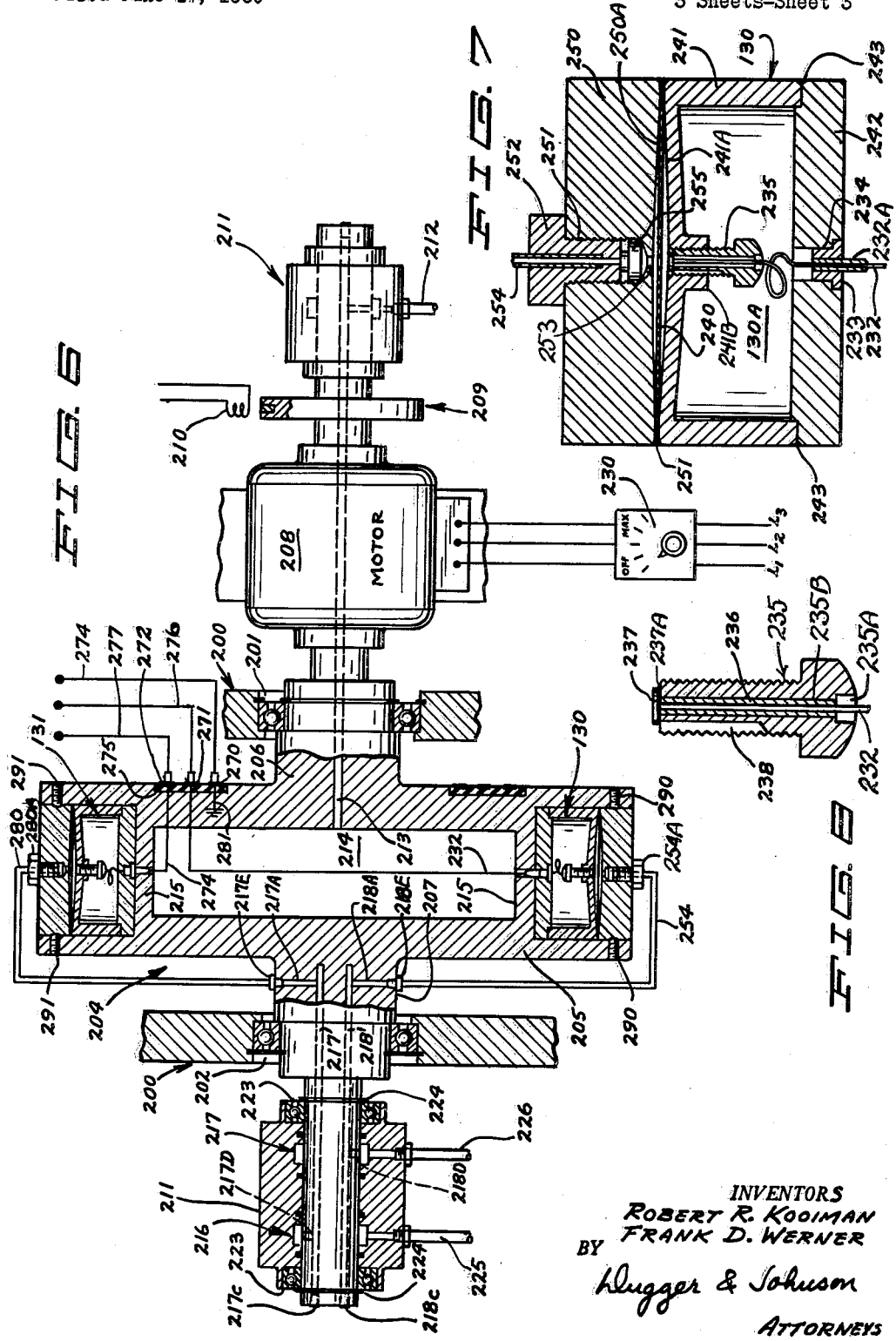
INVENTORS
ROBERT R. KOOIMAN
FRANK D. WERNER
BY
Dugger & Johnson
ATTORNEYS

United States Patent Office 3,111,847
Patented Nov. 26, 1963

3,111,847
DIGITAL ROTATING PRESSURE REFERENCE
Robert R. Kooiman and Frank D. Werner, Minneapolis, Minn., assignors to Rosemount Engineering Company, Minneapolis, Minn., a corporation of Minnesota
Filed June 17, 1960, Ser. No. 36,866
10 Claims. (Cl. 73—386)

This invention relates to new devices for measuring pressure wherein the significant parameters involved in measurement are indirectly determined by direct measurement of rotational speed (or frequency). More particularly, the invention relates to instrumentation to be used for pressure calibration at any desired altitude, and particularly high altitudes. It is an object of the invention to provide methods and apparatus for satisfying the aforesaid purposes.

The invention employs a new system of calibration wherein the sensing mechanism consists of a sensitive surface which is deflected due to differential pressure, and is fully re-balanced against such differential pressure by centrifugal forces created through rotation of the sensing apparatus. It is an object of the invention to provide apparatus of this character.

It is an object of the invention to provide a system of instrumentation wherein pressure differential re-balancing is indicated by measurement of rotational speed (or frequency).

It is another object of the invention to provide a sensitive pressure responsive system which may be used as a service test unit for pressure calibration of high pressure altitudes.

Other and further objects are those inherent in the invention herein described, illustrated, and claimed, and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated in the drawings wherein:

FIGURE 1 is a longitudinal sectional view, partly broken away, and partly schematic, illustrating one form of the invention;

FIGURE 2 is a transverse sectional view taken along the line and in the direction of arrows 2—2 of FIGURE 1;

FIGURE 3 is a fragmentary longitudinal sectional view, similar to a portion of FIGURE 1, illustrating a slightly modified form of the invention;

FIGURE 4 is a longitudinal sectional view, partly broken away, and partly schematic, illustrating another form of the invention;

FIGURE 5 is a fragmentary enlarged sectional view of a portion of the apparatus shown in FIGURE 4;

FIGURES 6, 7, and 8, are related views illustrating a further embodiment of the invention, and in which FIGURE 8 is a longitudinal sectional view partly broken away and partly schematic;

FIGURE 7 is an enlarged transverse sectional view of one of the elements of FIGURE 6;

FIGURE 8 is a further enlarged longitudinal sectional view of the electro-static plate element of the device shown in FIGURE 7 (and also in FIGURE 6).

Throughout the drawings, corresponding numerals refer to the same parts.

Referring to FIGURE 1, this embodiment of the invention comprises a tubular container generally designated 10 having a relatively thin tubular wall 11 which is closed at one end by cap 12, having an integral shaft 14, and at the other end, by cap 13 having an integral shaft 32—35. Each of the end caps 12 and 13 is hermetically sealed and strongly attached mechanically to the tubular shell 11 with the shafts axially aligned. Thus, the junction of the tubular shell with the end cap 12 is welded to the end cap at the weld 12A. Similarly, the end cap 13 is welded to the tube 11 at the weld 13A. The shaft portions 14 and 32 are co-axial with the tubes 11 and the whole device is carefully made so as to be well-balanced, and so that the exterior surface of the tube 11 is cylindrical.

The structure 10—12—14—13—32 is supported in bearings and is motor driven by a variable speed motor 38. Thus, the shaft portion 14 has a turned-down end presenting a shoulder 17, against which the bearing 18 is placed. The bearing is held in place by a snapring 19. Bearing 18 is mounted in the frame 20 and is held in the frame by the snapring 21.

The shaft 32 is likewise turned down so as to provide the shoulder 33 against which the bearing 31 is placed, and is held in place by the snapring 34. The bearing 31 is mounted in the frame 30 and is held in place by the snapring 31A. The end of the shaft 32 is turned down at 35 to receive a flexible coupling 36 which connects to the motor shaft 37 of the motor 38, which is suitably mounted. The motor 38 is supplied from lines L1 and L2 through an on-off variable speed control 41, which is connected to the motor through the lines 39 and 40. By rotation of the knob of the speed control, the motor 38 may be shut off, or it may be controlled at any desired speed within the speed range of the motor. Any suitable motor control may be utilized.

The shaft portion 14 is turned down at the shoulder 22 and is threaded, and upon the threaded end there is placed a small speed-counter disc 24, of non-magnetic material, in the periphery of which there is inset a magnetic slug 26, which is so arranged that it rotates close to a sensing coil 27. The disc 24 is held onto the end of the shaft by the lock nut 25. As the disc rotates, a voltage will thus be generated in coil 27 and rotational speed can thus be read as a frequency.

Through the shaft portion 14 there is an axial bore 28, terminating in a glass or metal seal-off tube 29, the end 29A of which may be pinched off so as to hermetically seal the rotating unit, so that the interior space 51 thereof is sealed with reference to the external atmosphere.

On the shaft 14 there is the shoulder 15, against which there is pressed a brass or bronze slipring 16, on which the brush 47 rides, the brush being supported in a suitable insulated bracket 46. The brush 47 is connected to an external circuit by the line 48.

Adjacent the middle 50 of the tube 11, there is an arcuate condenser plate 44 (see FIGURE 2), which is mounted in a suitable insulating bracket 43. This plate 44 is connected to an external circuit by the line 45. The plate 44 and the adjacent external surface of the tube 11 are separated by a dielectric space 50A, and the plate 44 and the tube 11 thus form an electrical condenser. Any deflection of the tube which causes a variation in the (thickness of the) dielectric space 50A will change the electrical capacitance of this condenser, which can be sensed by a suitable electrical external capacitance read-out circuit.

In operation, the entire space 51 of the rotating element is evacuated, and in a normal case, this space would be evacuated to a condition of complete vacuum. However, any pre-determined negative pressure may be established in the space 51. The pressure differential on the tube 11 therefore causes the tube to be deflected radially inwardly, and the deflection is a maximum approximately half-way between the two end caps 12 and 13, that is to say, at the positions of the electrical condenser element 44. Therefore, with the rotating element in a condition of non-rotation, a certain electrical capacitance will exist, and this can be sensed in the read-out circuits 45—48. When the motor 38 is then started and brought up to speed, a centrifugal force will be applied to the material of the tube 11, and at certain speed, this centrifugal force will exactly balance the forces imposed on the tube due to the differential pressure, thereby bringing the tube 11 back to its initial cylindrical shape.

The analytical relationship between pressure and rotational velocity for this equilibrium condition is given by Expression 1.

(1) $$P = \rho h R_m w^2$$

Pressure differential is P, diaphragm mass density is $\rho$, thickness of diaphragm is $h$, rotation velocity is $w$, and $R_m$ is a mean radius of revolution which may be calculated from Expression 2.

(2) $$R_m = \frac{R_2^2 + R_1 R_2 + R_1^2}{3 R_2}$$

where $R_1$, $R_2$ are inner and outer radii respectively.

When rotational speeds are high, the inertial effects on the gas itself must be taken into account to determine the correct value for pressure at the diaphragm surface. This correction may be obtained from Expression 3.

(3) $$P = P_0 \exp \frac{\gamma w^2 r^2}{2 a_0^2}$$

where P is pressure at radius arm $r$, $P_0$ is pressure at zero radius arm, $a_0$ is sonic velocity, $\gamma$ is specific heat ratio, and $w$ is rotational velocity. This membrane motion will decrease the thickness of the dielectric space 50A and accordingly change the electrical capacitance and bring it back to the same capacitance existing prior to evacuation of the space 51, that is prior to the inward deflection of the tube 11. This is sensed by the external circuit 45—48. It is assumed that the entire instrument may be aboard an aircraft flying at various altitudes. The rotational speed necessary to "re-balance" the tube 11, to a condition of tubular configuration existing prior to evacuation, will vary as the aircraft altitude is increased.

The term "re-balance" as used herein means the centrifugal force due to speed of rotation equals the sum of the pressure applied radially inwardly on tube 11 due to the difference in pressure outside and inside the tube 11. When these forces are balanced, tube 11 will resume its original undeflected conditions and dimensions. This manner of almost perfect rebalance of forces practically eliminates errors associated with deflections of spring members. The greatest pressure differential will be when the aircraft is at ground level, where the pressure differential and hence the radial inward deflection of the tube 11, are maximum. The pressure differential and hence inward deflection of tube 11 will decrease as the aircraft ascends to higher and higher altitudes. Accordingly the rotational speed of the motor needed to rebalance will likewise be a lesser and lesser r.p.m., as the aircraft height increases.

The rotational speed of the motor is read directly as frequency by the external circuit connected to the sensing coil 27 and the speed (or frequency) scale is thus an expression of pressure and can be directly so calibrated, if desired. The external circuit need only be a frequency measuring circuit, and where one magnetic slug 26 is used in the periphery of disc 24, there will be one pulse or cycle in the external circuit for each revolution. Obviously, more than one magnetic slug 26 can be used in the periphery of the disc 24 if desired, and the frequency as read on the external circuit will therefore be the speed times the number of magnetic slugs in the periphery.

In some instances it is desirable to provide for continuous evacuation of the instrument, or to provide for varying the pressure within the space 51. To this end, there is provided, in FIGURE 3, a slightly modified form of the invention wherein the shaft 14, is deprived of its seal-off tube 29, and instead is provided with an extension shown under the bracket 14B upon which a suitable rotating gland is provided. Thus, the bore 28, which extends all the way to the end of the extension 14A of shaft 14 is plugged at 28A, and a hole 28B is drilled into the shaft so as to provide a port to the cylindrical outer surface of the shaft. This port is intercepted by an annular space 51A within the non-rotatable portion 55 of the gland. The gland is held in place by collars 56—56, and has a non-rotatable external pipe connection 57. The gland of course is provided with internal seals, as many as are required, which seal the non-rotatable portion of the gland to the surface of the shaft. Thus by connecting a negative pressure source to the pipe 57, this same negative pressure can be communicated to the annular space 51A and thence to the bore 28B and thence through the bore 28 to the interior space 51 of the rotating element. In this way, the rotating elements 11—12—13 can be continuously evacuated or brought to any desired negative pressure.

Referring to FIGURE 4, there is illustrated another form of the invention which provides several sensing devices, of a slightly different form, and wherein the pressures applied to the sensing devices are all brought out to external stationary tubular connections. Referring to FIGURE 4, the rotating element generally designated 65 is in the form of a wheel 66, having a hollow interior 69, and two co-axial integral end shafts 67 and 68. The wheel is preferably circular on its rim, and is provided with two or more flats at the surfaces 73 and 108, these flat surfaces being equally distributed arcuately around the rim of the wheel. In the embodiment in FIGURE 4, two such surfaces are illustrated, but it is obvious that more than two could be used if desired. In general, the bearing support, motor drive, speed indicator, and glands, of the device shown in FIGURE 4 are the same as with reference to FIGURE 1. Thus, the hub 67 is provided with a shoulder at 67C against which the bearing 62 is seated, and it is held upon the shaft by the snapring 126, the bearing being held into the frame 60 by means of the snapring 62A. Beyond this bearing the shaft is turned down at the shoulder 67B so as to provide a reduced portion 67C, which serves as a location for the gland 136. The shaft is again turned down at the shoulder 67D and is threaded at 127 so as to provide a location for the non-magnetic speed counting disc 128 having the magnetic slug 129 in the periphery thereof, which rotates adjacent the sensing coil 130. The disc 128 is held on by the lock nut 131. Beyond this threaded portion 127, the shaft is turned down to the diameter 67E, which forms a location for the second gland 132, and beyond this the shaft at 67F is turned down to a reduced end portion 67G which is connected by the flexible coupling 133 to the shaft 134 of the motor 135. The motor is a variable speed motor and is supplied from a suitable external source through the on-off variable speed control 149 similar to FIGURE 1. The shaft portion 67 has an axial bore hole 141 which extends all the way in from the end of the shaft and is plugged at 141C. This axial bore hole is connected by a radial bore hole 141A to a fitting at 142, which is connected to the pipe 143, and utilized as presently described. The shaft 67 has another bore hole 150 therein, which is drilled into the shoulder 67D and is plugged at 150A. This bore hole is connected by the radial bore hole 151B to the fitting 83 which is connected to the pipe 82 and utilized for a purpose to be described. The bore hole 141 has a radial bore hole extending at 141B and into the gland 132, that is held in place by suitable collars, and connected to its external non-rotating pressure supply tube 141. The gland 136 which is shown in section lines has suitable O-rings 136A and 136B which form the seals, the gland being held in place by bearing washers that are in turn engaged by snap rings engaging the shaft portion 67. The tube 150 is connected to the gland 136 by the radial bore hole 151C, and is hence connected to the external non-rotating supply tube 140 of the gland. Therefore, any pressure established on the pipe 140 will be communicated to the gland 136 and through the channels 151C—150—151B to the tube 82. Likewise any pressure established on the tube 141 will be communicated through the gland 132 and through the channels 141B—141—141A to the tube 143.

At the opposite end, the rotating element 65 is provided with the shaft 68 that is turned down at the shoulder 68C which forms a reduced diameter portion of the shaft on which the bearing 63 is seated, the bearing being held in place on the shaft by the snapring 127 and held in place in the frame 61 by the snapring 63A. Beyond the bearing the shaft is turned down to the reduced diameter 68A, which serves as a location for the gland 122, which is likewise held in place by the collars 125. The gland is provided with an external non-rotating supply pipe 124 which communicates through the channel 121B in the shafts, to the axial channel 121 and thence into the interior 69 of the rotating element 65. The outer end of the shaft 68B is provided with a plug at 121A for the channel 121.

Upon the flat surfaces 73 and 108 there are mounted pressure sensing elements shown opposite the brackets 70 and 71 respectively. These elements are mechanically (but not necessarily physically) identical in size and weight and when located on the rotating element 65 they balance each other.

The only difference between the elements 70 and 71 is that they can be calibrated for sensing different pressures at different speeds of rotation. Element 70 consists of two plates 72 and 77. These plates meet on the plane 74 and during construction are welded together at the weld 78. Between the two elements there is placed a very thin pressure tight membrane 76, which is preferably placed under radial tension initially before the two plates 72 and 77 are clamped together and welded. This will put a little radial tension on the diaphragm 76 and hence keep it flat. The diaphragm 76 is adapted to be deflected due to differential pressures and each of the elements 72 and 77 is provided with a shallow dish concavity adjacent the diaphragm, which exactly matches the shape of the diaphragm when it is deflected. In FIGURE 4, the amount of dishing shown is much exaggerated. Normally this would only be a few thousandths of an inch. Through the plate 72 there are ports 85—85 and through the plate 77 there is a channel 80—80 which connects to the fitting 81 that attached to the pressure communicating pipe 82. Accordingly, any pressure placed on the tube 140 of gland 136 will be communicated to the pressure circuit previously described and to the fittings 81 in channel 80 to the exterior surface of the diaphragm 76. If this pressure is different than the pressure that is applied to the diaphragm through the ports 85—85 from the interior 69 of the rotating element 65, the diaphragm will be deflected.

Sensing the deflection of the diaphragm 76 is accomplished by means of condenser plate elements constructed as shown in FIGURE 5, to which reference is made. The plate element 72 is provided with a plurality of drill holes, suitably shaped to receive the insulator and plate element assembly 86. This assembly consists of a ceramic insulator 90 and an axial wire 91, which is supported by the reinforcement 93. The wire terminates as a plate element 92 that is fused to the insulator 90. The entire element 86 is fused into the plate 72. There are preferably provided at least three such elements as at 86, 87, and 88, of FIGURE 4. It will be understood that the elements 87 and 88 are identical with that shown at 86 in FIGURE 5. The element 87 is at the middle of the circular diaphragm 76 and the elements 86 and 88 are on a diametric line across the diaphragm, equally spaced from the central element 87. The three sensing elements, in cooperation with the metallic plates 76 form an electrical condenser element, the capacitance of which can be sensed by an external circuit. The external circuit is connected as follows: Upon one of the external flat surfaces of the rotating hub 65 there are mounted a plurality of slip rings 97 supported by the insulator 97A, 102 supported by the insulator 103, and 118 supported by the insulator 119. All of the insulators 97A, 103, and 119 may be made as one flat annular insulator, if desired, as shown in FIGURE 6, and inset into the rotating hub for greater mechanical support, if desired. The sliprings are set concentrically with the axis of the rotating element 65, and each slipring is connected to the interior space 69 through an insulator as at 96, 101, and 117. These insulators can be made in the same way as shown in FIGURE 5 except that instead of the plate 92 at the terminal end, the wire 91 is connected to the slipring element. Thus the slipring 97 is connected by the wire 95 and through the junction 94 and wires 91—91 to the condenser plate elements 86, 87, and 88. The central condenser plate element 87 is connected via the wire 98 and junction 99 through the insulator 101 to the slip ring 102.

The sensing element at 71 is the same as that shown at 70, except that the diaphragm 107, or its distance from the rotating axis, may be varied so that it senses a different pressure. This element is provided with an inner plate 105 and an outer plate 106 which are welded together at 109 with the metal diaphragm 107 clamped between them under slight radial tension. The entire element 71 is welded to the rotating hub 65 at the weld 108 and the element 70 is likewise welded to the rotating hub at weld 73. In this way the interior space 69 of the rotating device 65 is entirely sealed off by the elements 70 and 71 (and as many more as are used) mounted on the periphery. The plate 106 has a channel 145 leading through it to the connection 144 which is connected to the pipe 143, and accordingly, any pressure applied to tube 141 of gland 132 will be communicated, as previously described, to the pipe 143 and thence through the coupling 144 and channel 145 to the external surface of the diaphragm 107. On the plate 105 there are mounted the capacitor plate elements 111, 112, and 113, which are exactly the same as shown in FIGURE 5, and the lead wires from these are connected as illustrated in FIGURE 4, as follows:

The lead wire 114 from the element 111 and the lead wire 116 from the element 113 are connected together at the junction 115 and thence through the insulator 117 to the slip ring 118. The capacitor plate element 112 is connected by means of its lead wire 120 to the junction 99, previously described, and thence through the lead wire 100, and through the insulator 101 to the slip ring 102. The slip rings are connected to external circuits by suitable brushes and electrical connections.

The operation of the device is as follows:

The motor 135 is brought up to speed, and at a certain rotational speed, as indicated by the speed counter 128—230, the diagram 76, or diagram 107, or both of them, if they are identical in mass, thickness and distance from the rotating axis, will be brought into flat condition, when the pressure differential across these diaphragms is exactly balanced by the centrifugal forces. The pressure differential will, of course, be determined by the difference in pressure applied to the pipe 124, which communicates to the interior surfaces of each of the diaphragms 76 and 107, and the pressures individually applied to the pipes 140 and 141 which extend to the exterior surfaces of the same diaphragms, respectively. It is obvious that pipes 140 and 141 could be internally connected and just one gland is required in this case. In the usual case, the pressure 124 is a complete vacuum or a certain low negative pressure which is lower than the pressure applied to the pipes 140 and 141. Accordingly, each of the diaphragms 76 and 107 will be deflected inwardly and at a certain rotational speed will be re-balanced to a flat condition, at a prescribed speed as indicated by the external speed indicating circuit attached to the coil 130.

Referring to FIGURE 6, there is illustrated another form of the invention wherein the pressure sensing elements are similar to those shown in FIGURE 4, except that they are made as individual units, similar in construction to those shown in co-pending application of Frank D. Werner, Ser. No. 1,975, filed January 12, 1960.

Referring to FIGURE 6, the device has a frame 200, having bearings 201 and 202 mounted therein, similar to those shown in FIGURE 4. The rotating element generally designated 204 is in the form of a wheel, that is perfectly balanced, and is provided on its periphery with cylindrical sockets in which the pressure sensing elements 130 and 131 are placed and retained by the set screws 290 and 291, respectively. These pressure sensing elements are illustrated in FIGURES 7 and 8. The rotating structure 204 is similar to that shown in FIGURE 4, and has a shaft 206 and 207. The shaft 206 is turned down to a reduced diameter at its outer end to provide space for double gland elements 216—217, which is provided with its own bearings 223—223 and is held in place by the snaprings 224—224. The gland element has internal O-ring seals, and is provided with the stationary pressure connecting pipes 225 and 226. The shaft 207 is provided with drilled channels 217 and 218, which are plugged at their outer ends 217C and 218C respectively. Shaft 217 has a side channel 217A leading to the coupling 217E and a side channel 217D leading to the gland portion 216, and through it to the external pressure pipe 225. The channel 218 has a side channel 218A leading to the coupling 218E and a side channel 218D leading to the gland portion 217 and through it to the external pressure connection 226.

The hollow interior 214 of the rotating structure 204 is connected through the axial channel 213 in the shaft 206 to and through the gland 211 to the pressure pipe 212 which is connected to a source of vacuum. On the reduced end portions of the shaft 206 there is directly mounted the rotor of the motor 208, and there is also mounted the speed counter disc 209 which is similar to those shown in FIGURES 1 and 4, and rotates adjacent the sensing coil 210 connected to an external speed indicating circuit. The motor is supplied from lines L1, L2, and L3, to an on-off, variable speed controller, 203, by means of which the motor speed and on-off operation can be controlled.

On one of the side surfaces of the rotating element 204, (the right side in FIGURE 6) there is inset an annular insulating ring 275 on which are mounted coaxial annular slipring elements 270, 271, and 272. The slipring element 270 is grounded, and the slipring element 271 is connected through an insulated wire 232 to the electrical contact portion of the sensing element 130, as will be described. The slipring 272 is connected through the wire 274 to the sensing element 131, as will be described. One brush is provided for each slipring, and is mounted in a stationary insulated brushholder, not shown. The brushes are connected respectively to the external circuits as follows: Circuit 274 is connected through the brush to slipring 270, and this is grounded to the machine at 281. The circuit 276 is connected through its brush to the slipring 271, and to the interior connection wire 232. The circuit 277 is connected through its brush to the slipring 272 and to the internal connection wire 274.

Referring to FIGURE 6, each of the sensing elements 130 and 131 is identically constructed except for the thickness of the diaphragm, and the degree of evacuation of its interior cavity. Thus, referring to FIGURE 7, which illustrates the sensing element 130, this element consists of a heavy base plate 250, a cup element 241, and a cup cover 242. Between the plate 250 and the bottom of the cup there is clamped a thin flat metal diaphragm 240, which is radially tensioned prior to being clamped between the bottom of the cup and the plate 250. The three elements, namely the cup 241, diaphragm 240, and the plate 250 are then welded together simultaneously as at the weld 251, and the cup is accordingly hermetically sealed and mechanically attached, not only to the diaphragm 240 but also the diaphragm 240 is hermetically sealed and mechanically attached to the plate 250. The diaphragm, when in an undeflected condition, is perfectly flat, due to the initial radial tension on it, and when a differential pressure is applied to the diaphragm, it will be deflected in one direction or the other, depending upon the amount of pressure applied. The plate 250 is very slightly dished along the surface 250A, and the bottom of the cup is likewise very slightly dished along the surface 241A. The shape of these dished cavities 250A and 241A are much exaggerated in FIGURE 7, being normally only a few thousandths of an inch deep, as compared to a planar surface. The shape of the dished cavities thus formed, conforms exactly to the shape of the diaphragm 240 when it is deflected due to the differential pressure and consequently fully supports it and protects it against high pressure differentials. The coverplate 250 is provided with a central axial hole 251 that is threaded and is shaped conically at its bottom and provided with a small port 253 leading into the chamber formed between the diaphragm 240 and the surface 250A. A porous filter element 255 is preferably included in the bottom of the threaded hole 251 and is held in place by the end of the threaded element 252, which also serves as a connection for the pipe 254 which is soldered or brazed into the connection nut 252.

The bottom of the cup 241 is provided with a boss at 241B, which is threaded to receive the screw 235, which is shown in enlarged form in FIGURE 8. This screw has a screw slot 235A and an axial hole 235B, in which an insulator sleeve 236 of ceramic material extends. The sleeve serves to insulate the lead-in wire 232, which extends through the ceramic insulator to a button end 237, which acts as a condenser plate. A thin washer 237A has insulating material and insulates the plate 237 from the end of the screw 235, and electrical connection is made from plate 237 to the wire 232. A small longitudinal groove 238 extends along one of the exterior surfaces of the screw and serves as a pressure communicating passage which, as will be observed in FIGURE 7, connects the interior space 130A of the pressure capsule through the screw slot 238 to the space between the surface 241A of the cup and the underside of the diaphragm 240. Accordingly, any pressure within the cup is communicated to the underside of the diaphragm.

The cup 130 is provided with the cover plate 242 which is welded in place at the weld 243. A concentric hole 234 is provided in the cover through which extends an insulator 233, the insulator supporting a metal tube 232A, through which the wire 232 extends.

In assembling the device, a screw 235 is first assembled, and its insulator tube 236 is fused to the body of the screw and to the lead-in wire 232, with the plate 237 in place. The cup 241 is then clamped to the plate 250, with the diaphragm 240 radially stretched preliminarily and clamped between them. The weld 251 is then made. Before the cover 242 is placed, the screw 235 is preliminarily adjusted so as to bring the plate 237 to the approximate level of the adjacent surface 241A. The cover 242 can then be placed and the weld 243 completed, but this is before the insulator 233 is placed. Any final adjustment of the screw 235 is then made with a split end screw driver reaching into the slot 235, and the insulator 233 is then threaded onto the end of the wire 232 and heat is applied so as to fuse the insulator 233 to the cover 242. A suitable connection is then made to the tube 232A, with the wire 232 loosely extending through it, and the interior space 130 is then evacuated to a complete vacuum, or to any pre-determined negative reference pressure that may be desired. With this condition of evacuation continuing, the wire 232 is then soldered to the tube 232A, thus hermetically sealing the closed cup space 130A of the device. If desired, a separate connection may be provided for the cover 242 as shown in the aforesaid co-pending application, Ser. No. 1,975, and evacuation of the cup space 132A can thus be made through a separate pressure connection.

Two elements, as shown in FIGURE 6, or as many as may be desired, are placed in the rotating structure 204 and held in place by the retaining screws as at 290 and 291. The electrical connections as to the wire 232 and for the element 130 and 274 for the element 131 are made as indicated in FIGURE 6, prior to completing the assembly. The pressure pipe 254 of the element 130 is then connected back to the coupling 218E and the pressure connection pipe 280 for the element 131 is connected back to the coupling 217E. The device is then ready to be used. For each of the units 130 and 131, conditioning of the evacuation may be identical or different, depending upon the pressure desired to be sensed. If the device is used in, for example, an aircraft, the pressure pipes 226 and 225 are left open to atmosphere, and as the aircraft ascends, a lesser and lesser rotational speed will be required for bringing the diaphragm such as diaphragm 240 of the unit 130 and the corresponding diaphragm of the unit 131, to a condition of complete balance, in which the diaphragm is in planar condition, as sensed by the external electrical capacitor circuit. If the unit is used at a fixed altitude, varied pressures may be applied ot the external pipes 225 and 226. It is noted parenthetically that the pressure connection 212 is not utilized in the apparatus as shown in FIGURE 6, but may be utilized where the interior space 130 of one or the other of the pressure capsules is desired to be connected to the interior space 214 of the rotating framework 204, in which case, a suitable port is provided through the cover-plates 242, and matching orifices placed through the endwalls 215—215, with suitable O-ring seals, to seal the capsule covers 242 to the rotating framework.

As many widely apparently different embodiments of this invention may be made without departing from the spirit and scope thereof, it is to be understood that we do not limit ourselves to the specific embodiments herein.

What is claimed:

1. A pressure transducer comprising a closed vessel having a flexible wall adapted to be deflected toward the interior of the vessel when the pressure on the interior thereof is less than the pressure on the exterior thereof, a rotatable structure, means for rotating said rotatable structure, said rotatable structure mounting said closed vessel for rotation about an axis which is displaced from said flexible surface of the closed vessel on a line normal to said flexible surface, said flexible surface being oriented so that its direction of deflection due to pressure change is in a substantially radial direction in respect to the axis of rotation, sensor means for indicating movement of said surface back toward undeflected condition of the flexible wall, and means indicating speed of rotation of said flexible surface about said axis of rotation.

2. The apparatus of claim 1 further characterized in that the flexible wall is tubular.

3. The apparatus of claim 1 further characterized in that said flexible wall is a planar diaphragm.

4. The apparatus of claim 1 further characterized in that said closed vessel is hermetically sealed.

5. The apparatus of claim 1 further characterized in that said closed vessel is provided with a pressure conduit connection on said rotatable structure to a non-rotating pressure source.

6. The apparatus of claim 1 further characterized in that said closed vessel is located with the flexible wall distal in respect to said axis and the remainder of the closed vessel proximal in respect to said axis and a closure is provided over that surface of the flexible wall which is exterior to the closed vessel and a pressure connection is provided from said closure and on the rotatable structure to a non-rotating pressure source.

7. The apparatus of claim 6 further characterized in that said closed vessel and closure are a part of said rotatable structure.

8. The apparatus of claim 6 further characterized in that said closed vessel and closure are made as a unit and are detachably secured to the rotatable structure.

9. A pressure transducer comprising a vessel in which a certain pressure is adapted to be established, said vessel being mounted for rotation about an axis of rotation, means for sensing the speed of rotation of said vessel, said vessel including a flexible wall which is displaced from said axis of rotation, said flexible wall being so oriented that it will be deflected radially inwardly toward said axis of rotation when the pressure on the vessel is increased, means connected to the vessel for rotating it sufficiently that the centrifugal force on the flexible wall will re-balance the flexible wall to the undeflected position it occupies when there is no reduced pressure in the vessel, and means for sensing said re-balanced condition of said flexible wall.

10. A pressure transducer comprising a vessel in which a certain pressure is adapted to be established, said vessel being mounted for rotation about an axis of rotation, means for rotating said vessel about said axis, said vessel including a flexible wall which is displaced from said axis of rotation, said flexible wall being so oriented that it will be deflected radially inwardly toward said axis of rotation when there is an increased pressure in the vessel, and means for sensing said undeflected position of said flexible wall and for sensing the speed of rotation of the vessel.

References Cited in the file of this patent
UNITED STATES PATENTS 2,905,000    Roth ------------------ Sept. 22, 1959